(12) United States Patent
Elhaddad et al.

(10) Patent No.: US 10,686,568 B2
(45) Date of Patent: Jun. 16, 2020

(54) ACTIVE FLOW DIAGNOSTICS FOR CLOUD-HOSTED NETWORKS

(71) Applicant: Microsoft Technology Licensing, LLC, Redmond, WA (US)

(72) Inventors: Mahmoud Shawky Elhaddad, Newcastle, WA (US); Ranjit Puri, Bothell, WA (US); Deepak Narula, Bellevue, WA (US); Madhan Sivakumar, Seattle, WA (US); Vikas Bhardwaj, Redmond, WA (US); Harish Kumar Chandrappa, Bothell, WA (US); Daniel M. Firestone, Seattle, WA (US); Xuan Zou, Seattle, WA (US); Keith Loren Mange, Beaux Arts, WA (US); Manish Tiwari, Bellevue, WA (US); Keerthi Shankar, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 563 days.

(21) Appl. No.: 15/393,888

(22) Filed: Dec. 29, 2016

(65) Prior Publication Data
US 2018/0191471 A1  Jul. 5, 2018

(51) Int. Cl.
*H04L 1/24* (2006.01)
*H04L 29/12* (2006.01)
*H04L 29/06* (2006.01)

(52) U.S. Cl.
CPC ............ *H04L 1/24* (2013.01); *H04L 61/2592* (2013.01); *H04L 69/22* (2013.01); *H04L 61/2514* (2013.01)

(58) Field of Classification Search
CPC ....... H04L 1/24; H04L 61/2592; H04L 69/22; H04L 61/2514
See application file for complete search history.

(56) References Cited

U.S. PATENT DOCUMENTS 7,773,611 B2  8/2010  Boot et al.
7,916,652 B1  3/2011  Lima et al.
(Continued)

OTHER PUBLICATIONS

Wu, et al., "Virtual Network Diagnosis as a Service", In Proceedings of ACM Symposium on Cloud Computing, Oct. 1, 2013, pp. 1-15.
(Continued)

*Primary Examiner* — Walter J Divito
(74) *Attorney, Agent, or Firm* — Liang IP, PLLC

(57) ABSTRACT

An overlay network refers to a network that is implemented as various different virtual resources on a physical network referred to as an underlay network. Diagnostics are performed on the overlay network by injecting diagnostic packets from a source endpoint targeting a target endpoint. These endpoints can be in the overlay network, on-premises with the other endpoint but in a different overlay network, or off-premises form the other endpoint. The diagnostic packets include a data packet encapsulated with a diagnostic encapsulation header that can be removed by a network element in the underlay network to allow processing of the data packet, and then added back on. The network element maintains trace information that is a record of receipt of the diagnostic packet and operations performed on the diagnostic packet. A tracing service collects and analyzes this trace information from the various network elements.

20 Claims, 7 Drawing Sheets

(56) References Cited

U.S. PATENT DOCUMENTS

| | | | |
|---|---|---|---|
| 8,750,288 B2 | 6/2014 | Nakil et al. | |
| 9,357,410 B2 | 5/2016 | Nedeltchev et al. | |
| 9,565,138 B2* | 2/2017 | Chen | H04L 49/602 |
| 2002/0065921 A1* | 5/2002 | Davidson | H04L 29/06 709/227 |
| 2009/0135722 A1* | 5/2009 | Boers | H04L 45/00 370/236 |
| 2014/0229605 A1 | 8/2014 | Besser | |
| 2015/0081863 A1 | 3/2015 | Garg et al. | |
| 2016/0182336 A1 | 6/2016 | Doctor et al. | |
| 2017/0104677 A1* | 4/2017 | Agarwal | G06F 11/079 |

OTHER PUBLICATIONS

"Overview of Network Virtualization using Generic Routing Encapsulation (NVGRE) Task Offload", https://msdn.microsoft.com/windows/hardware/drivers/network/overview-of-network-virtualization-using-generic-routing-encapsulation—nvgre--task-offload, Retrieved on: Oct. 3, 2016, 1 pages.

Avramopoulos, et al., "Stealth Probing: Efficient Data-Plane Security for IP Routing", In Proceedings of USENIX Annual Technical Conference, May 30, 2006, 6 pages.

Wu, et al., "Virtual Network Diagnosis as a Service", In USENIX Open Networking Summit, Mar. 2, 2014, pp. 1-2.

"Implementing Tunnels", http://www.cisco.com/c/en/us/td/docs/ios/12_4/interface/configuration/guide/inb_tun.pdf, Published on: May 2, 2005, pp. 1-66.

"About Traceflow", https://pubs.vmware.com/NSX-62/index.jsp?topic=%2Fcom.vmware.nsx.admin.doc%2FGUID-233EB2CE-4B8A-474C-897A-AA1482DBBF3D.html, Retrieved on: Oct. 8, 2016, 2 pages.

Kim, et al., "In-band Network Telemetry (INT)", http://p4.org/wp-content/uploads/fixed/INT/INT-current-spec.pdf, Published on: Jun. 2016, pp. 1-28.

"The P4 Language Specification", http://p4.org/wp-content/uploads/2016/03/p4_v1.1.pdf, Published on: Jan. 27, 2016, pp. 1-124.

* cited by examiner

ACTIVE FLOW DIAGNOSTICS FOR CLOUD-HOSTED NETWORKS

BACKGROUND

As computing technology has advanced, various different techniques for providing networks and computing functionality have been developed. One such technique is providing a tenant network that can include various different virtual resources (e.g., virtual machines, virtual disks, etc.). The tenant network is implemented on a host network that includes various different physical resources (e.g., physical machines, physical storage devices, etc.). While providing such tenant networks implemented on a host network are beneficial, they are not without their problems.

One such problem is that it can be difficult to perform diagnostics on tenant networks, making it difficult to detect, when there is a malfunction in the network, the cause of the malfunction. This is in part because tenant administrators are aware only of the tenant network and do not know of the topology of the host network. Tenant administrators thus are not able to run diagnostics experiments directly on the host network hardware and therefore cannot determine if the malfunction happened on the host network. Additionally, flows originating in the tenant network can access (via an appropriate gateway) external endpoints, such as in the tenant's network or on the Internet. Host network administrators do not have access to resources in the tenant's network or to the Internet endpoints, and they too are therefore unable to single-handedly debug flows concerning the tenant network in an end to end manner. These problems can lead to frustration for both the owner or the tenant network as well as the owner of the host network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a network element of an underlay network, a diagnostic packet is received at the network element, the underlay network hosting one or more overlay networks. A data packet is processed by the network element, the data packet being included as part of the diagnostic packet and encapsulated by a first diagnostic encapsulation header. Trace information regarding the diagnostic packet is maintained by the network element. The processed diagnostic packet is transmitted to a next element in a path to a target endpoint specified by a second diagnostic encapsulation header of the processed diagnostic packet, the second diagnostic encapsulation header rather than the first diagnostic encapsulation header encapsulating the data packet.

In accordance with one or more aspects, in a source endpoint of a network, a data packet is generated. Metadata associated with the data packet is maintained, the metadata indicating that the data packet is to be part of a diagnostic packet. A diagnostic encapsulation header is added to the data packet to obtain the diagnostic packet, and the diagnostic packet is transmitted to a next element in a path to a target endpoint specified by the diagnostic packet.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
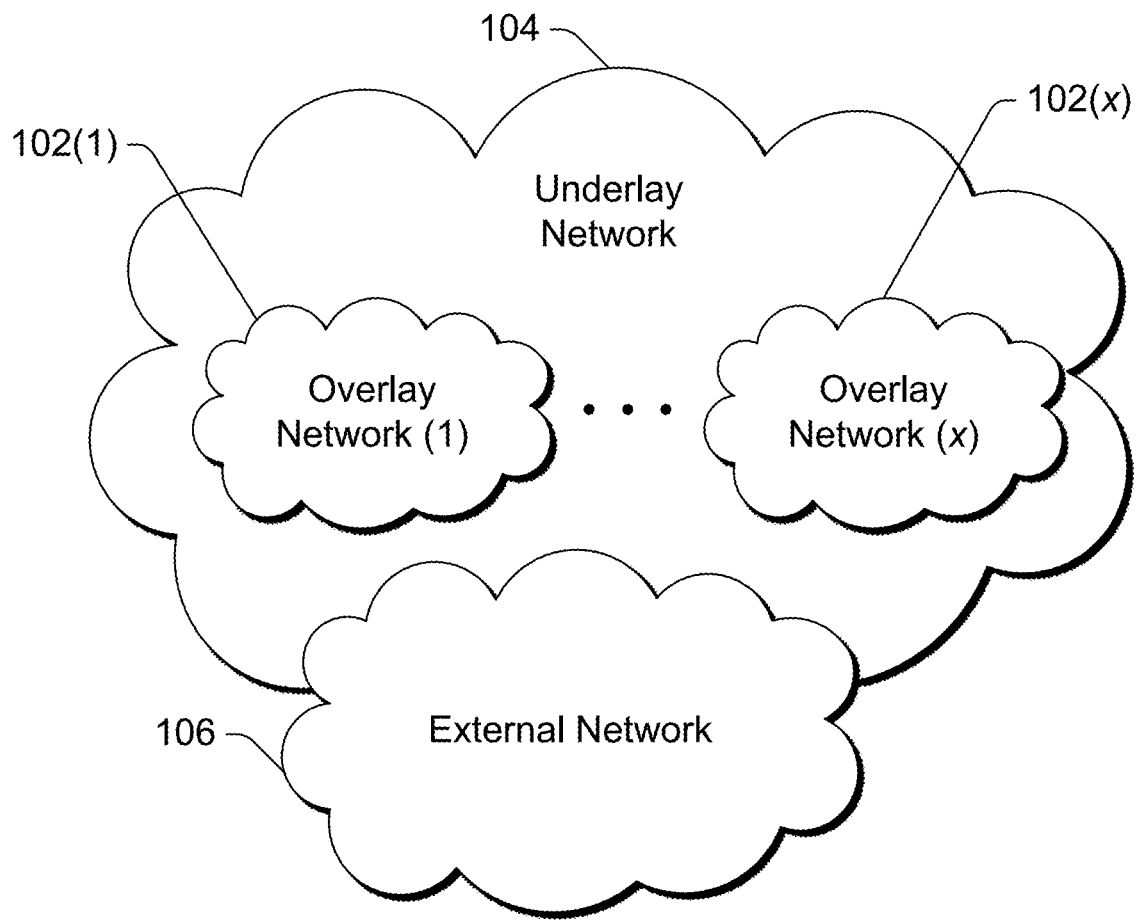
FIG. 1 illustrates an example system including various networks in accordance with one or more embodiments.

Active flow diagnostics for cloud-hosted networks is discussed herein. A cloud-hosted network refers to a network that is implemented as various different virtual resources on a physical network. The virtual resources include, for example, virtual machines, virtual storage devices, virtual network interfaces, virtual switches, virtual switch ports, and so forth. The physical network includes various different physical resources, such as physical machines (e.g., servers), physical disks or other storage devices, physical switches, physical network interfaces, load balancing devices, and so forth. The physical machines can run various different virtual machine monitors (e.g., hypervisors) to implement the virtual resources. The physical network is also referred to as an underlay network, and the cloud-hosted network is also referred to as an overlay network.

Communication can occur between different endpoints in the overlay network, these endpoints being virtual resources of the overlay network. Communication can also occur between an endpoint in the overlay network and an endpoint external to the overlay network (e.g., a consumer device accessing a virtual server in the overlay network). Communication between endpoints is performed using data packets that are routed from one endpoint through various network elements (e.g., gateways, routers, load balancers, etc.), and these packets are routed through the underlay network. For example, a data packet sent from one endpoint in the overlay network to another endpoint in the overlay network is routed through at least one network element of the underlay network.

The techniques discussed herein allow diagnostics to be performed on the overlay network by injecting diagnostic packets from an endpoint. The endpoint from which a diagnostic packet can be injected can be an endpoint in the overlay network, an endpoint that is not part of the overlay network but is located in the same location as the overlay network (e.g., in the same data center), or an endpoint that is not part of the overlay network and is located in a different location than the overlay network (e.g., a mobile device connected to the overlay network via the Internet). The diagnostic packet can also be injected on behalf of an endpoint in the overlay network, such as by a virtual port that the overlay network endpoint is connected to.

The diagnostic packet can include any of a variety of different data, commands, requests, and so forth. For example, the diagnostic packet can include a ping command. The diagnostic packet refers to a data packet used to diagnose the operation of the overlay network and/or the underlay network. The diagnostic packet is a data packet encapsulated with a header that identifies the data packet as a diagnostic packet. Each network element in the underlay network receives the diagnostic packet, removes the header (decapsulates), and process the data packet as normal (as it would any other data packet that is not a diagnostic packet). After being processed, the network element then encapsulates the data packet again with a header that identifies the data packet as a diagnostic packet, and then sends the data packet to the next network element or endpoint as appropriate given the destination of the diagnostic packet.

The network element maintains a record of receipt of the diagnostic packet, operations performed on the diagnostic packet, and where the diagnostic packet was sent to. This record is also referred to as a trace or trace information. Each diagnostic packet can have a different identifier that allows the diagnostic packets to be distinguished from one another (e.g., a globally unique id (GUID)). This identifier can be included as part of the diagnostic packet, or alternatively can be determined by the network elements (e.g., by applying a hash function to at least part of the data packet). A tracing service collects this trace information from the various network elements. Various analysis can be performed on this trace information, allowing the flow of diagnostic packets through the underlay network to be identified. Improper flows (e.g., flows that are contrary to a desired policy) can be identified by this analysis, allowing the administrator of the overlay network and/or the underlay network to correct the operation of the network elements as appropriate.

The techniques discussed herein are also referred to as active diagnostics. Diagnostic packets are injected into the networks and the outcome of operations on the diagnostic packets in the underlay network are observed via the trace information. The diagnostic packets allow diagnostics to be run on demand. The cost and overhead of performing ongoing monitoring of all data packets (rather than just diagnostic packets) and the amount of trace information that would be analyzed by such ongoing monitoring of all data packets would be computationally intensive and require a large amount of storage to facilitate analysis, and thus is avoided using the techniques discussed herein.

The techniques discussed herein thus allow problems in a cloud-hosted network to be diagnosed. The network elements operate on the diagnostic packets as if they were regular (not diagnostic packets), allowing the normal or typical operation of the underlay network to be analyzed. The techniques discussed herein further allow the owner or administrator of an overlay network to perform diagnostics despite the fact that the overlay network is implemented on the underlay network for which the owner or administrator of the overlay network typically has no control or access to.

FIG. 1 illustrates an example system 100 including various networks in accordance with one or more embodiments. The active flow diagnostics for cloud-hosted networks discussed herein can be implemented in a system such as system 100. System 100 includes one or more (x) overlay networks 102 implemented on an underlay network 104. The overlay networks 102 can also be referred to as tenant networks hosted by the underlay network 104 (which can also be referred to as a host network). Each overlay network 102 is implemented as one or more virtual resources. Any of a variety of different virtual resources can be included in an overlay network 102, such as a virtual machine (e.g., implementing a virtual server, a virtual network element (e.g., gateway, load balancer, etc.), a virtual storage device, and so forth. Any one of these virtual resources can be an endpoint in the overlay network 102, serving as a source and/or target for data packets. Different overlay networks 102 can be, for example, networks for different tenants (e.g., companies or other organizations) that are hosted by the underlay network 104.

The underlay network 104 includes various different physical resources, such as servers, magnetic disks or other storage devices, network elements (e.g., load balancers, edge gateways, protocol gateways, firewalls, switches, network interfaces, etc.), and so forth. The physical machines can run various different virtual machine monitors (e.g., hypervisors) to implement the virtual resources of the overlay networks 102. The physical resources in the underlay network 104 can communicate with each other using the underlay network 104 itself, and can also communicate with other devices and physical resources (e.g., Internet services, other data center sites, etc.) via an external network 106. The external network 106 can be any of a variety of data networks external to the underlay network 104, such as the Internet, a phone network, and so forth. Elements in each overlay networks 102 can also communicate with entities at other locations from the overlay network (e.g., outside the data center that includes the overlay network) using an appropriate gateway, such as a network address translation (NAT) gateway to a public Internet protocol (IP) network when attempting a connection to an internet address or with the use of a site to site gateway (e.g., to connect to devices in the on-premises network corresponding to an overlay network).

Each network element in the underlay network can be implemented in a variety of different manners. For example, a network element can be implemented as a hardware device, such as using various different components of an integrated circuit or on-chip system, an application-specific integrated circuit (ASIC), a field-programmable gate array (FPGA), a complex programmable logic device (CPLD), and other implementations in silicon or other hardware devices. By way of another example, a network element can be implemented as a device that includes software and/or firmware, such as instructions that are executed by one or more processors in the network element.

All of the physical resources of the underlay network 104 can be located on the same premises, which refers to the physical resources being situated at the same physical location. For example, the physical resources can all be situated in the same data center. Alternatively, the physical resources of the underlay network 104 can be located on different premises, which refers to the physical resources being situated at different physical locations. For example, the physical resources can be located in different data centers that are in different cities or countries. The physical resources that are located on different premises can communicate via the external network 106, and thus in such situations at least part of the external network 106 can be viewed as being part of the underlay network 104.

Although the overlay networks 102 are implemented on the same underlay network 104, the two overlay networks 102 are isolated from each other so that the virtual resources in one overlay network 102 cannot directly access the virtual resources in another overlay network 102. Although data packets for different overlay networks 102 can pass through the same network elements in the underlay network 104, the network elements in the underlay network 104 pass those data packets to the proper overlay network 102 (e.g., an endpoint in the overlay network 102 targeted by the data packet) rather than another overlay network 102. Additionally, elements in one overlay network 102 can indirectly access elements in another overlay network 102 if the data packets pass through an appropriate public interface (e.g., a Public IP address such as a Load Balancer IP (a load balancer network element)).

To transport the traffic of an overlay network 102 in the underlay network 104, data packets from the overlay network 102 are operated on within the underlay network 104, for example, to emulate routing in the overlay network 102, to isolate the address space of different overlay networks 102, to perform routing in the underlay network 104, to implement access control, and so forth. These operations include transformations such as rewriting of header fields, and encapsulating traffic into VxLAN (Virtual Extensible Local Area Network) tunnels. These operations can be implemented in software, hardware or firmware components, or combinations thereof, and applied to a data packet in a specific order. These operations are transparent to the resources in the overlay network 102. Situations can arise in which a data packet gets discarded as a result of the application of an operation such as access control, or due to the failure to apply an operation (e.g., due to exhaustion of resources, such as ports in network address translation (NAT) and missing policy configurations). The techniques discussed herein facilitate discovery of where in the underlay network 104 data packets are discarded.

The following is an example of a data packet flow between two overlay networks 102. A diagnostic packet can be communicated using this data packet flow, with trace information for the diagnostic packet being collected using the techniques discussed herein. The data flow begins with an element A of an overlay network A, with a data packet targeting a load balanced IP address of an overlay network B. The diagnostic packet is transformed to a request from a public IP address for overlay network A targeting the load balanced IP address of overlay network B. The load balancer selects an appropriate element B in the overlay network B to load balance the request to, and the element B processes the request and generates a response. The response is data packet sent from element B of overlay network B to the public IP address for overlay network A. This is re-written by the load balancer as a diagnostic packet from the load balanced IP address of overlay network B to the public IP address for overlay network A. The public IP address for overlay network B is converted (e.g., NAT is undone) as the data packet is received by overlay network A, and routed to element A of overlay network A.

Figure 2:
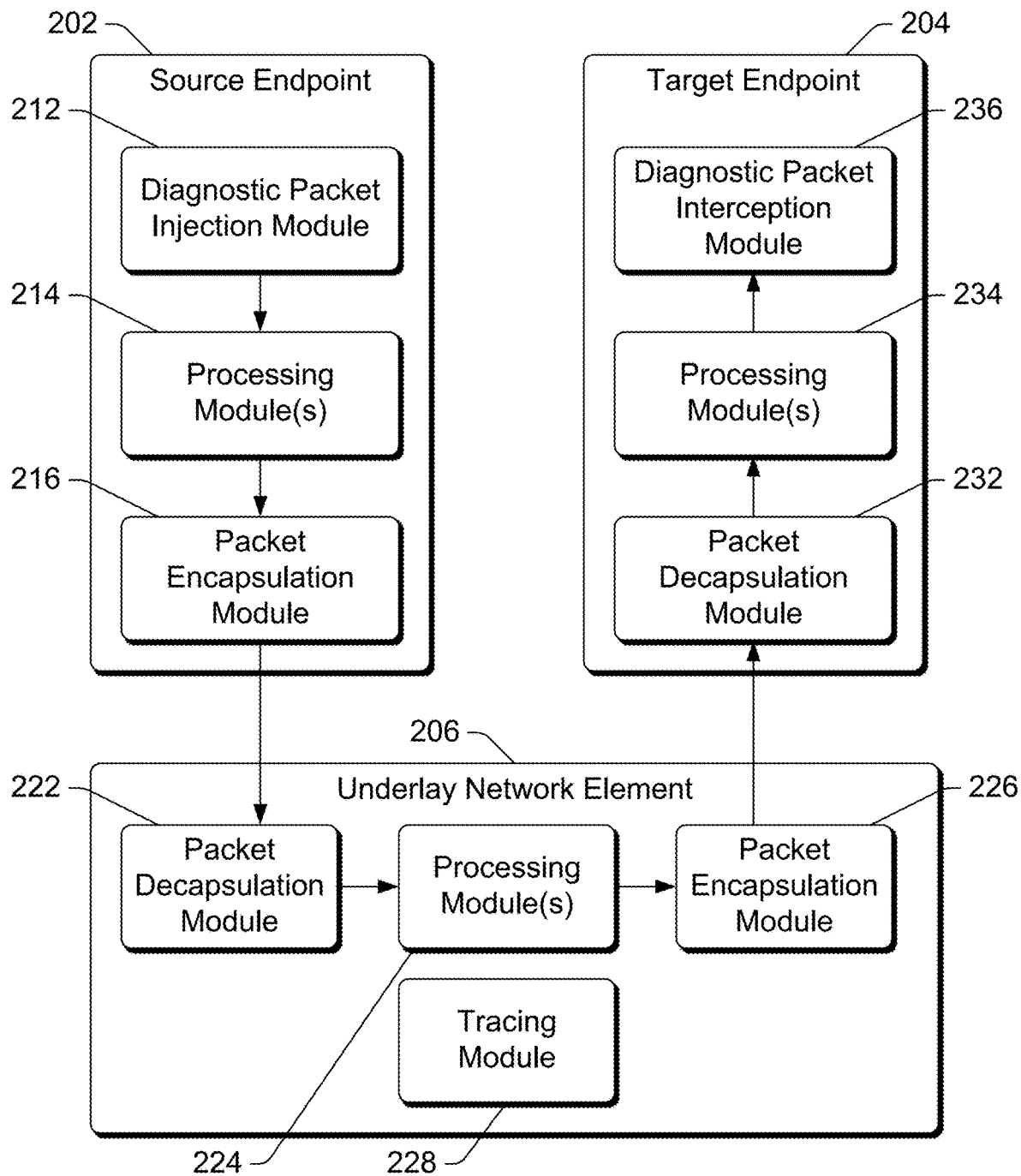
FIG. 2 illustrates an example data flow for a diagnostic packet in accordance with one or more embodiments.

FIG. 2 illustrates an example data flow 200 for a diagnostic packet in accordance with one or more embodiments. In the example data flow 200, a diagnostic packet is sent from a source endpoint 202 to a target endpoint 204. Generally, a diagnostic packet is generated at the source endpoint 202 and communicated to the target endpoint 204 via the underlay network element 206. In the example data flow 200, the path or route of a diagnostic packet is from the source endpoint 202 through the underlay network element 206 to the target endpoint 204. Although a single underlay network element 206 is illustrated, it should be noted that the path or route of the diagnostic packet can pass through any number of network elements.

In one or more embodiments, both the source endpoint 202 and the target endpoint 204 are a virtual resource in the same overlay network. For example, both the source endpoint 202 and the target endpoint 204 can be virtual resources in the overlay network 102(1) of FIG. 1. Alternatively, one of the source endpoint 202 and the target endpoint 204 is a virtual resource in an overlay network, and the other of the source endpoint 202 and the target endpoint 204 is an on-premises endpoint behind a site to site (e.g., a cloud to on-premises data center) gateway. For example, the source endpoint 202 can be a virtual resource in the overlay network 102(1) of FIG. 1, and the target endpoint 204 can be a data center service (e.g., storage) that multiple overlay networks 102 have access to. In this example, the elements in the overlay network 102(1) can access the target endpoint 204 if they do so via a load balancer IP fronting multiple storage devices (including the target endpoint 204). Alternatively, one of the source endpoint 202 and the target endpoint 204 is a virtual resource in an overlay network, and the other of the source endpoint 202 and the target endpoint 204 is off-premises from the overlay network. For example, the target endpoint 204 can be a virtual resource in the overlay network 102(1) of FIG. 1, and the source endpoint 202 can be a server or other physical device at a different physical location (e.g., a different data center) as the physical devices implementing the overlay network 102(1).

The source endpoint 202 includes a diagnostic packet injection module 212, one or more processing modules 214, and a packet encapsulation module 216. The diagnostic packet injection module 212 generates a data packet that will be used as a diagnostic packet. The data packet generated by the diagnostic packet injection module 212 can include any variety of different data, commands, requests, and so forth, such as a ping command. The data packet generated by the diagnostic packet injection module 212 need not be specified as a diagnostic packet at this point and itself need not include any special flags or settings indicating it is a diagnostic packet. However, the source endpoint 202 does maintain metadata associated with the data packet that identifies the data packet as a diagnostic packet. This metadata remains associated with the data packet as the data packet is processed in the source endpoint 202, and is used by the packet encapsulation module 216 as discussed in more detail below.

The one or more processing modules 214 can perform any of a variety of different operations on the data packet generated by the diagnostic packet injection module 212. The processing performed by the one or more processing modules 214 is the same processing as is performed by the source endpoint 202 on data packets that are not diagnostic packets in order to configure or set the data packets in the manner desired by the source endpoint 202 for sending to the target endpoint 204.

The packet encapsulation module 216 encapsulates the data packet, as processed by the one or more processing modules 214, with a diagnostic encapsulation header. In one or more embodiments, the one or more processing modules 214 configure the data packet to be communicated through the underlay network as part of a virtual tunnel. Encapsulating the data packet with a diagnostic encapsulation header encapsulates that data packet (configured the data packet to be communicated through the underlay network as part of a virtual tunnel), nesting the virtual tunnel inside a diagnostic tunnel. Effectively, this diagnostic encapsulation header results in, for each virtual tunnel, a parallel diagnostic tunnel that follows the same path through the underlay network and carries the diagnostic traffic for the virtual tunnel of the tenant (e.g., the owner of the overlay network). The diagnostic encapsulation header is an additional header that indicates to the target endpoint 204 and the underlay network element 206 that the packet is a diagnostic packet.

Figure 3:
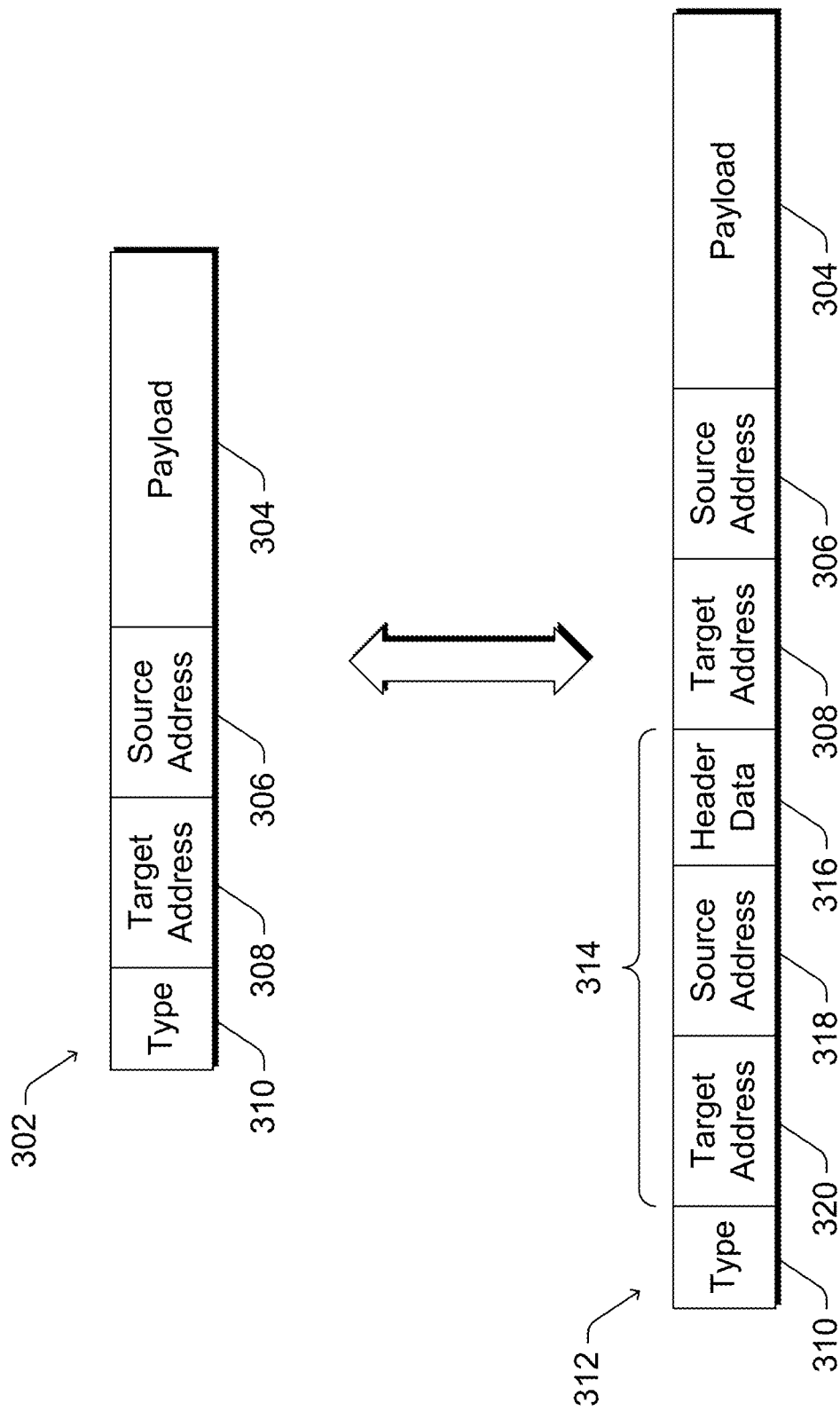
FIG. 3 illustrates an example of a diagnostic packet in accordance with one or more embodiments.

FIG. 3 illustrates an example of a diagnostic packet in accordance with one or more embodiments. A data packet 302, such as a data packet generated by the diagnostic packet injection module 212, is shown. The data packet 302 includes a payload portion 304, a source address portion 306, a target address portion 308, and a type portion 310. The payload portion 304 includes the data, command, request, and so forth for the data packet 302. The source address portion 306 includes the network address (e.g., Internet protocol (IP) address) of the source of the diagnostic packet 302 (e.g., source endpoint 202). The target address portion 308 includes the network address (e.g., IP address) of the target endpoint for the data packet 302. The type portion 310 includes an identifier or type of the network protocol or technology being used (e.g., Ethernet).

The data packet 302, after being encapsulated with a diagnostic encapsulation header, is shown as diagnostic packet 312. The diagnostic packet 312 includes the payload portion 304, the source address portion 306, the target address portion 308, and the type portion 310, the same as the data packet 302. However, the diagnostic packet 312 also includes a diagnostic encapsulation header portion 314, which includes a header data portion 316, a source address portion 318, and a target address portion 320. The target address portion 308 includes the network address (e.g., IP address) of the target endpoint, and initially is the same as the network address in the target address portion 308 (although this can optionally be changed later by a network element). The header data portion 316 includes an identifier that serves as an indication that the diagnostic packet 312 is a diagnostic packet. The identifier can be a flag, label, key, GUID, and so forth. Encapsulating the data packet with the diagnostic encapsulation header refers to adding the diagnostic encapsulation header portion 314 to the data packet. In one or more embodiments, the diagnostic encapsulation header portion 314 includes the same addressing information (e.g., source and target addresses) as the original data packet so that the diagnostic packet is routed and processed by the underlay network elements just like the data packet without the diagnostic encapsulation header portion 314 would have been routed and processed.

Returning to FIG. 2, the packet encapsulation module 216 sends the diagnostic packet to the target endpoint 204. The diagnostic packet is sent to the target endpoint by a network interface card (NIC) or other component (which may also be a virtual resource in situations in which source endpoint 202 is a virtual resource on an overlay network), which transmits the diagnostic packet. This transmission can be performed using wired or wireless communications. The next network element in the underlay network along the path or route to the target endpoint 204 (e.g., as determined by the network address in the diagnostic encapsulation portion of the diagnostic packet (e.g., the network address in the target address portion 320 of FIG. 3) receives the diagnostic packet. In the illustrated example of FIG. 2, the next network element in the underlay network along the path or route to the target endpoint 204 is the underlay network element 206.

The underlay network element 206 includes a packet decapsulation module 222, one or more processing modules 224, a packet encapsulation module 226, and a tracing module 228. The packet decapsulation module 222 receives the diagnostic packet and decapsulates the diagnostic packet. Decapsulating the diagnostic packet refers to removing the diagnostic encapsulation header. For example, referring again to FIG. 3, the underlay network element 206 receives the diagnostic packet 312 and removes the diagnostic encapsulation header portion 314. The decapsulated diagnostic packet is the data packet 302.

The packet decapsulation module 222 provides the data packet to the one or more processing modules 224. The data packet provided by the packet decapsulation module 222 need not be specified as a diagnostic packet and itself need not include any special flags or settings indicating it is a diagnostic packet. However, the underlay network element 206 does maintain metadata associated with the data packet that identifies the data packet as a diagnostic packet. This metadata remains associated with the data packet as the data packet is processed in the underlay network element 206, and is used by the packet encapsulation module 226 as discussed in more detail below.

The one or more processing modules 224 can perform any of a variety of different operations on the data packet. The processing performed by the one or more processing modules 224 is the same processing as is performed by the underlay network element 206 on data packets that are not diagnostic packets. The operations performed by the one or more processing modules 224 vary based on the particular functionality of underlay network element 206. These operations can include changing various information in the data packet, such as the network address in the data packet, a port number in the data packet, the payload of the data packet, and so forth.

By way of example, if the underlay network element 206 is a load balancer, then multiple different endpoints may be associated with the network address that is the target of the data packet. The one or more processing modules 224 use various rules or criteria to select one of those multiple endpoints, and change the network address of the data packet as appropriate so that the data packet is routed to the selected endpoint. By way of another example, if the underlay network element 206 is a firewall, then the one or more processing modules 224 can apply various rules or criteria (e.g., based on the network address specified in the data packet, the port number (e.g., the IP port number) specified in the data packet, the data packet type, etc.) to determine whether to allow the data packet through to the target endpoint 204. If the one or more processing modules 224 determine that the data packet can be allowed through, then the one or more processing modules 224 provide the data packet to the packet encapsulation module 226. However, if the one or more processing modules 224 determine that the data packet is not be allowed through, then the one or more processing modules 224 delete, drop, or otherwise dispose of the data packet so that it is not provided to the packet encapsulation module 226.

The packet encapsulation module 226 encapsulates the data packet with a diagnostic encapsulation header. This diagnostic encapsulation header is, for example, the diagnostic encapsulation header portion 314 of FIG. 3. The diagnostic encapsulation header that the packet encapsulation module 226 encapsulates the data packet with includes at least some of the same information as was included in the diagnostic encapsulation header removed when the packet decapsulation module 222 decapsulated the diagnostic packet. This information is included in the metadata associated with the diagnostic packet that is maintained by the underlay network element 206. Information that is the same as was included in the diagnostic encapsulation header removed when the packet decapsulation module 222 decapsulated the diagnostic packet can be, for example, a flag or other indicator that the data packet is a diagnostic packet, an identifier of the diagnostic packet, and so forth. However, some information that the packet encapsulation module 226 encapsulates the data packet with can be different than the information that was included in the diagnostic encapsulation header removed when the packet decapsulation module 222 decapsulated the diagnostic packet. For example, the network address, port number (e.g., IP port number), and so forth in the diagnostic encapsulation header may have been changed by the one or more processing modules 224, and this new network address, port number, and so forth as determined by the one or more processing modules 224 is included in the diagnostic encapsulation header by the packet encapsulation module 226.

The tracing module 228 monitors (also referred to as observes) the diagnostic packet at the underlay network element 206. The tracing module 228 need not monitor all data packets received at the underlay network element 206, but does monitor diagnostic packets. The tracing module 228 can be notified of the diagnostic packets in various manners, such as by the packet decapsulation module 222, by accessing metadata associated with a diagnostic packet at the underlay network element 206, and so forth. The tracing module 228 communicates the trace information it obtains from monitoring the diagnostic packet to a tracing service, as discussed in more detail below.

The monitoring of the diagnostic packet can include collecting various different trace information, such as information describing operations performed on the data packet by the one or more processing modules 224, a status of the underlay network element 206 or the diagnostic packet, an identifier of the underlay network element 206, and so forth. The trace information can also include information in the diagnostic encapsulation header (e.g., an identifier of the diagnostic packet), changes made to the diagnostic encapsulation header (e.g., differences between the diagnostic encapsulation header removed by the packet decapsulation module 222 and the diagnostic encapsulation header added by the packet encapsulation module 226), and so forth. The trace information can also include various information from a header of the data packet, such as time to live (TTL) information for the packet. The trace information can also include various additional information regarding the data packet, such as a hash value generated by applying a hash function to the data packet or a portion of the data packet (e.g., the payload), an indication that the one or more processing modules 224 deleted, dropped, or otherwise disposed of the data packet so that it is not provided to the packet encapsulation module 226, and so forth. The trace information can also include any subset of the header and/or payload for the packet.

The packet encapsulation module 226 sends the diagnostic packet to the target endpoint 204. The diagnostic packet is sent to the target endpoint by a NIC or other component, which transmits the diagnostic packet. This transmission can be performed using wired or wireless. The next network element in the path or route to the target endpoint 204 (e.g., as determined by the network address in the diagnostic encapsulation portion of the diagnostic packet added by the packet encapsulation module 226) receives the diagnostic packet. In the illustrated example of FIG. 2, the next network element in the path or route to the target endpoint 204 is the target endpoint 204.

The target endpoint 204 includes a packet decapsulation module 232, one or more processing modules 234, and a diagnostic packet interception module 236. The packet decapsulation module 232 receives the diagnostic packet and decapsulates the diagnostic packet, removing the diagnostic encapsulation header added by the packet encapsulation module 226.

The packet decapsulation module 232 provides the data packet to the one or more processing modules 234. The data packet provided by the packet decapsulation module 232 need not be specified as a diagnostic packet and itself need not include any special flags or settings indicating it is a diagnostic packet. However, the target endpoint 204 does maintain metadata associated with the data packet that identifies the data packet as a diagnostic packet. This metadata remains associated with the data packet as the data packet is processed in the target endpoint 204 by the one or more processing modules 234.

The one or more processing modules 234 can perform any of a variety of different operations on the data packet provided by the packet decapsulation module 232. The processing performed by the one or more processing modules 234 is the same processing as is performed by the target endpoint 204 on data packets that are not diagnostic packets in order to transform the underlay packet for delivery to the overlay. These rules can include, for example, rules to de-capsulate the packet, modify header fields such as addresses or ports, block delivery of the packet, and so forth.

The diagnostic packet interception module 236 receives the data packet and removes any metadata associated with the data packet indicating that the data packet is a diagnostic packet. Additional processing on the data packet can then optionally be performed by the target endpoint 204. For example, if the data packet includes a ping command, then the target endpoint 204 can generate and return a response to the ping command.

In the discussion of FIG. 2, the diagnostic encapsulation header is discussed as being removed by the packet decapsulation module 222 and a diagnostic encapsulation header is discussed as being added by the packet encapsulation module 226. Alternatively, in some situations, such as when the network element 206 does not perform inspection of the inner packet headers (e.g., the headers of the diagnostic packet that are encapsulated within the diagnostic encapsulation header), the diagnostic encapsulation header need not be removed by packet decapsulation module 222 and added by the packet encapsulation module 226. The tracing module 228, however, still monitors the diagnostic packet at the network element 206.

The diagnostic tunnel can be thought of as being terminated when the diagnostic encapsulation header is removed. For example, one diagnostic tunnel can begin at the source endpoint 202 and end at the packet decapsulation module 222, and another diagnostic tunnel can begin at the packet encapsulation module 226 and end at the packet decapsulation module 232. At each encapsulation stage (e.g., each packet encapsulation module), the diagnostic tunnel may use a different diagnostic tunnel identifier and/or a different encapsulation protocol.

In one or more embodiments, network interface cards in the underlay network apply encapsulation protocol offloads (e.g., computing checksum based on inner header encapsulated by the diagnostic encapsulation header) to diagnostic packets. In such embodiments, the network interface card is configured with the diagnostic tunnel identifier so that the network interface card bypasses the diagnostic encapsulation header and looks for the next encapsulation protocol header in the diagnostic packet to determine whether the diagnostic packet should undergo offload processing. This helps ensure that the diagnostic packet undergoes the same offload processing in the network interface card as regular (non-diagnostic) packets.

Thus, as can be seen from the discussions herein, a diagnostic packet is treated like any other data packet in terms of processing performed by network elements. However, the encapsulation header allows the network elements to know the data packet is a data packet to be traced, and can respond appropriately to collect trace information regarding the data packet. The tracing of data packets thus follows a real-world or realistic path of data packets based on the content of the data packet and the normal operation of the network elements, rather than special treatment for a particular type of data packet and/or a pre-defined route having been specified for the diagnostic packet.

It should be noted that although FIG. 2 is illustrated as the source endpoint 202 including a diagnostic packet injection module and a packet encapsulation module, alternatively a diagnostic packet can be generated on behalf of an endpoint in the overlay network (e.g., source endpoint 202) as discussed above. For example, the diagnostic packet can be generated from within the virtual port that the endpoint in the overlay network is connected to. The virtual port applies policies on behalf of the tenant administrator (such as access controls as discussed above), and also transforms the diagnostic packet to be fit for delivery/routing on the underlay network as discussed above. Generating a diagnostic packet on behalf of the overlay network endpoint alleviates the need to write software within the tenant endpoint to generate diagnostic packets. For example, when a tenant (overlay network) administrator expresses concern that an element in the overlay network is not able to send a packet of a particular type to a particular destination, a diagnostic packet of that particular type targeting that particular destination can be generated and injected from the appropriate virtual port on behalf of the overlay network endpoint.

Similarly, although FIG. 2 is illustrated as the target endpoint 204 including a packet decapsulation module and a diagnostic packet interception module, alternatively a diagnostic packet can be captured/trapped by an interceptor on behalf of an endpoint in the overlay network (e.g., source endpoint 202) just before the diagnostic packet is delivered to that endpoint (e.g., as the last step in the data flow before the diagnostic packet is delivered to the endpoint). For example, the diagnostic packet can be captured or trapped by an interceptor (e.g., from within the virtual port that the target endpoint in the overlay network is connected to). By capturing or trapping the diagnostic packet just before the diagnostic packet is delivered to the target endpoint, the target endpoint need not respond to the diagnostic packet and need not be aware of diagnostic experiments being carried out on its behalf. The interceptor of the diagnostic packet can also respond to the diagnostic packet if appropriate (e.g., if desired for the diagnostic experiment being performed).

Figure 4:
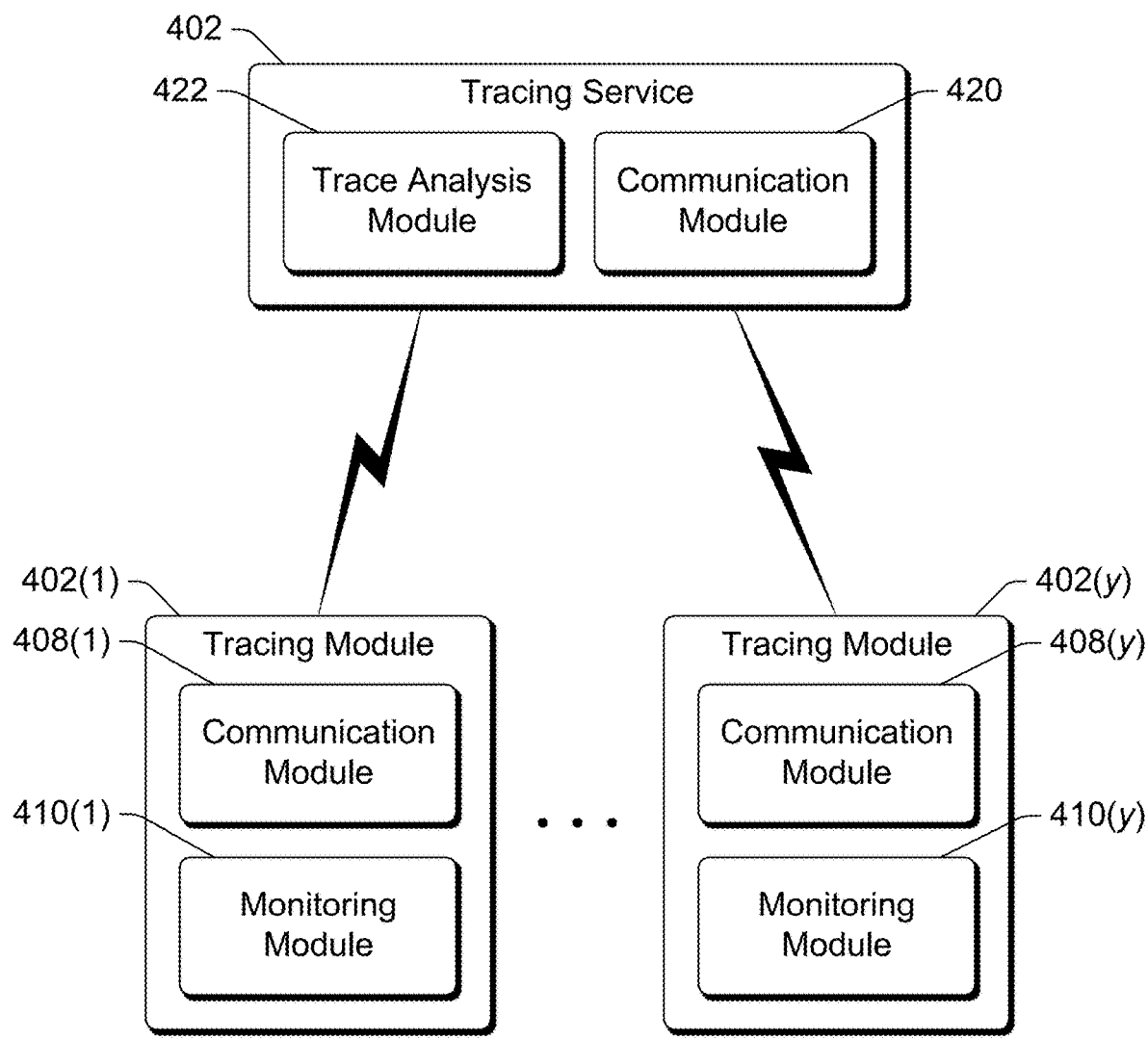
FIG. 4 illustrates an example trace information collection system in accordance with one or more embodiments.

FIG. 4 illustrates an example trace information collection system 400 in accordance with one or more embodiments. One or more underlay network elements include a tracing module (e.g., a tracing module 228 of FIG. 2), shown as tracing modules 402(1), . . . , 402(y). The tracing modules 402(1), . . . , 402(y) in each of multiple (y) different underlay network elements provide trace information to a tracing service 404. The tracing service 404 can be, for example, a remote service accessed via the Internet or another external network (e.g., external network 106 of FIG. 1), or via the underlay network that includes the underlay network elements.

Each tracing module 402 includes a communication module 408 and a monitoring module 410. The monitoring module 410 of a tracing module 402 monitors the diagnostic packets at the underlay network element implementing the tracing module, collecting various trace information as discussed above. The monitoring module 410 stores the collected trace information locally at the underlay network element implementing the tracing module 402. The communication module 408 communicates the trace information collected by the monitoring module 410 to the tracing service 402. The communication module 408 can communicate the trace information to the tracing service 402 at regular or irregular intervals, using a push model, in response to a request from the tracing service 402 (e.g., using a pull model), and so forth. The communication module 408 can communicate the trace information directly to the tracing service 402 (e.g., by sending data packets including the trace information to the tracing service 402). Additionally or alternatively, the communication module 408 can communicate the trace information to the tracing service 402 by writing or otherwise storing the trace information to a common data store that is accessible to the tracing service 402.

The tracing service 402 includes a communication module 420 and a trace analysis module 422. The communication module 420 receives the trace information from the tracing modules 402. The trace analysis module 422 analyzes the trace information received from the tracing modules 402 and optionally provides various feedback regarding the monitored diagnostic packets. Any of a variety of public and/or proprietary techniques can be used to analyze the trace information received from the tracing modules 402. The communication module 420 can also optionally receive various information (e.g., various metadata) maintained or recorded by the source endpoints and/or target endpoints regarding diagnostic packets, allowing the trace analysis module 422 to perform its analysis based on this additional information as well.

In one or more embodiments, the trace analysis module 422 uses the trace information to identify paths or routes that the diagnostic packets took through the underlay network. The paths or routes can be identified in various manners. For example, each diagnostic packet can have an identifier (e.g., a GUID). The trace information includes the identifier of the diagnostic packet, an identifier of the network element, and a timestamp indicating a date and time the diagnostic packet was received by the network element. By way of another example, the trace information can include the identifier of the diagnostic packet, an identifier of the network address of the diagnostic packet, and an identifier of the target address for the diagnostic packet as indicated in the diagnostic encapsulation header of the diagnostic packet sent by the network element.

By way of another example, the identifier of the diagnostic packet can be used to determine an order in which diagnostic packets are received by a network element. For example, a sequence of multiple diagnostic packets can be sent in a particular order, and the trace information used to determine whether the diagnostic packets are received by a network element in the same order as the diagnostic packets were sent.

By way of another example, each diagnostic packet includes a time to live field or portion that is decremented by each time the diagnostic packet is received by a network element. This time to live field or portion can be, for example, a portion of the diagnostic encapsulation header. The trace information can include the time to live information, and trace analysis module 422 can use this time to live information to determine the order of network elements that the diagnostic packet passed through (e.g., starting from the highest time to live value and ending at the smallest time to live value).

The path or route that a diagnostic packet took through the underlay network can be used in various different manners. For example, if a diagnostic packet was dropped or deleted by a network element, the path or route allows the network element that dropped or deleted the diagnostic packet to be readily identified. By way of another example, the path or route can be compared to a policy that is desired by an owner or administrator of an overlay network (or the underlay network), and a determination made as to whether the paths or routes conform to that policy.

In one or more embodiments, the diagnostic encapsulation header for a diagnostic packet includes an identifier of a diagnostic tunnel. This diagnostic tunnel identifier can be used in addition to or in place of an individual diagnostic packet identifier. Multiple different diagnostic packets can have the same diagnostic tunnel identifier, allowing groups of diagnostic packets to be treated and analyzed together.

In one or more embodiments, the diagnostic encapsulation header includes an identifier of a diagnostic tunnel but no specific identifier of the individual diagnostic packet. An identifier of each individual diagnostic packet can be generated by the underlay network element 206 (e.g., the tracing module 228) based on the content of the diagnostic packet. For example, the identifier of an individual diagnostic packet can be a copy of the innermost headers of the data packet (e.g., of data packet 302 of FIG. 3), and a hash value generated by applying a hash function to some fields of the innermost packet (e.g., the payload 304 of the data packet 302). It should be noted that in situations in which the identifier of the individual diagnostic packet is generated based on the content of the diagnostic packet, and the content of the diagnostic packet may be changed by the underlay network element (e.g., a processing module 224 of FIG. 2), this can result in two different identifiers of the individual diagnostic packet. This situation can be resolved in various manners, such as by the tracing module 228 maintaining as part of the trace information a record correlating the previous identifier of the diagnostic packet and the new identifier of the diagnostic packet.

Returning to FIG. 2, it should be noted that the packet encapsulation modules 216 and 226 encapsulate the data packet with the diagnostic encapsulation header as discussed above. In some situations, the data packet may have already been encapsulated with one or more other headers. In such situations, the packet encapsulation modules just encapsulate the data packet with any additional encapsulated headers. For example, each packet encapsulation module can view the data packet with any additional encapsulated headers as the "data packet" that it encapsulates with the diagnostic encapsulation header.

In one or more embodiments, each of the underlay network elements supports activating and deactivating diagnostics. When diagnostics are activated, the tracing module 228 monitors the diagnostic packets on the underlay network element 206 as discussed above. However, when diagnostics are deactivated, the tracing module 228 does not monitor the diagnostic packets on the underlay network element, and does not store any trace information.

Diagnostics can be activated and/or deactivated in various different manners. In one or more embodiments, a diagnostic tunnel identifier is used to indicate that diagnostics are activated. The source endpoint 202 (e.g., the diagnostic packet injection module 212 or the packet encapsulation module 216) and the underlay network element (e.g., the tracing module 228 or the packet decapsulation module 222) each get a currently authorized diagnostic tunnel identifier from a remote service. The remote service can be, for example, a service of the underlay network accessed via the Internet or another external network 106 of FIG. 1, or a service implemented as part of the underlay network 104 of FIG. 1. The remote service changes the authorized diagnostic tunnel identifier at various regular or irregular intervals, and provides the authorized diagnostic tunnel identifier only to endpoints and/or underlay network elements that are authorized to receive the diagnostic tunnel identifier (e.g., provide proper credentials, such as login name and password). The remote service can also optionally expose an API (e.g., a REST API) that an administrator can use to configure diagnostics in the data center.

If the packet decapsulation module 222 receives a diagnostic packet with a diagnostic tunnel identifier that does not match (e.g., is not the same as) the current authorized diagnostic tunnel identifier, then the packet decapsulation module 222 assumes that diagnostics are turned off. In response to the diagnostics being turned off, the packet decapsulation module 222 optionally removes the diagnostic encapsulation header, but the tracing module 228 does not collect any trace information for the diagnostic packet. Thus, the diagnostic tunnel identifiers can be used as a key to activate and deactivate diagnostics on the underlay network elements.

The network elements in the underlay network can include any of a variety of different types of network elements. The different network elements can implement the techniques discussed herein in different manners.

In one or more embodiments, a network element in the underlay network is a load balancer. A load balancer is a multitenant appliance that receives traffic destined to Virtual IP (VIP) addresses. Packets from a single flow are forwarded to one of several tenant's compute or storage resources implementing the service advertised under the VIP in the tenant's overlay network. The IP addresses of the virtual resources implementing the services are called Dedicated IP (DIP) addresses. Incoming packets to the load balancer may be already be encapsulated (tunneled). The load balancer matches the incoming packet to a tracked flow to identify the actual destination, or starts tracking the flow and mapping the newly started flow to one of the DIP addresses. The load balancer rewrites the headers, may add an encapsulation header to the packet (tunnel the packet), and forwards the packet to the DIP address. This is, for example, the processing performed by the one or more processing modules 224 of the underlay network element 206.

A diagnostic packet entering the load balancer has at least one encapsulation header (the diagnostic encapsulation header). As discussed above, the diagnostic packet goes through the decapsulation phase to remove the diagnostic encapsulation header, processing, and the encapsulation phase to add a diagnostic encapsulation header. No changes need be made to the processing performed by the load balancer, except for collecting trace information as discussed above.

In one or more embodiments, a network element in the underlay network is a protocol gateway. A protocol gateway is an interior (e.g., not at the edge of the underlay network) network element and is a multitenant appliance that receives packets originating from one overlay network and destined to a different overlay network within the underlay network. The packets entering the protocol gateway may be already encapsulated. The protocol gateway may decapsulate (e.g., remove an encapsulation header from) the incoming packet, perform a routing and modify the inner header of the packet, and then encapsulate the packet into a new tunnel and send it to its virtual network destination. This is, for example, the processing performed by the one or more processing modules 224 of the underlay network element 206.

A diagnostic packet entering the protocol gateway has at least one encapsulation header (the diagnostic encapsulation header). As discussed above, the diagnostic packet goes through the decapsulation phase to remove the diagnostic encapsulation header, processing, and the encapsulation phase to add a diagnostic encapsulation header. No changes need be made to the processing performed by the protocol gateway, except for collecting trace information as discussed above.

In one or more embodiments, a network element in the underlay network is an edge gateway. An edge gateway is a multitenant appliance that receives packets originating from an external network (e.g., the Internet) and then transports them to an overlay network. These packets may be tunneled, as in the case of a virtual private network (VPN), such as an Internet Key Exchange (IKE)/HyperText Transport Protocol Secure (HTTPS) tunnel. The edge gateway decapsulates/decrypts the packets if necessary, transforms the packet headers and sends them to an overlay endpoint (or possibly a VIP). This is, for example, the processing performed by the one or more processing modules 224 of the underlay network element 206.

If the diagnostic packet arrives at the exterior of the cloud platform edge (the edge gateway) with the diagnostic encapsulation header as the outermost encapsulation header, the edge gateway can follow the process described. The diagnostic packet goes through the decapsulation phase to remove the diagnostic encapsulation header, processing, and the encapsulation phase to add a diagnostic encapsulation header. No changes need be made to the processing performed by the edge gateway, except for collecting trace information as discussed above.

However, if the diagnostic packet arrives at the exterior of the cloud platform edge without the diagnostic encapsulation header as the outermost encapsulation header, then the edge gateway checks for the diagnostic tunnel header after decrypting the packet and removing any VPN tunnel header. The edge gateway can then proceed to remove the diagnostic encapsulation header, process the data packet, and add a diagnostic encapsulation header. Whether the diagnostic packet has the diagnostic encapsulation header as the outermost encapsulation header can be determined in various manners. For example, the edge gateway can check as to whether the outermost encapsulation header has a key or other identifier specifying the data packet as a diagnostic packet.

For traversal of the edge gateway in the opposite direction (e.g., from an overlay network an external (e.g., Internet) or other on-premises endpoint, the diagnostic packets are handled similarly. If the diagnostic packet arrives at the edge gateway with the diagnostic encapsulation header as the outermost encapsulation header, the edge gateway can follow the process described above (the diagnostic packet goes through the decapsulation phase to remove the diagnostic encapsulation header, processing, and the encapsulation phase to add a diagnostic encapsulation header). No changes need be made to the processing performed by the edge gateway, except for collecting trace information as discussed above. However, the edge gateway may alternatively be configured (e.g., a tenant based configuration) to add the diagnostic encapsulation header before encryption and the addition of the VPN header, as discussed in more detail below. In such situations, the edge gateway adds the diagnostic encapsulation header before encryption and the addition of the VPN header as instructed/configured.

As discussed above, diagnostic packets can be originated (e.g., injected into the underlay network) from various different source endpoints and target various different target endpoints. These endpoints can be a virtual resource in an overlay network, an on-premises endpoint, or an off-premises endpoint.

In one or more embodiments, packet injection and/or handling is performed at an external (e.g., Internet) endpoint. A diagnostic tool at the external endpoint exposes a diagnostic application programming interface (API) that allows the creation of flows or injection of individually crafted diagnostic packets (e.g., using raw sockets). The diagnostic tool creates a filtering rule to match the packet and prefix it with the diagnostic encapsulation header at the bottom of the network stack in the outbound direction. This helps ensure that the diagnostic encapsulation header is the outermost encapsulation header. The diagnostic tool can be packaged, for example, in a diagnostic virtual machine, a container, or just deployed on some host machine. An administrator or owner (e.g., of the underlay network) can use this diagnostic tool to inject a diagnostic packet at the exterior of the cloud platform network.

In the inbound direction (e.g., diagnostic packets received by the endpoint), the diagnostic packet matches the filtering rules and is decapsulated at the bottom of the network stack at the endpoint. The decapsulated data packet then makes its way up the network stack normally to the socket endpoint.

In one or more embodiments, packet injection and/or handling is performed at an on-premises endpoint. This situation is handled similarly to injection at an external (e.g., Internet) endpoint, although with one difference. An on-premises endpoint is connected to the overlay network through an on-premises gateway that forwards packets over a VPN tunnel to the overlay network's edge gateway.

If the on-premises gateway supports the techniques described here, then the on-premises gateway performs the decapsulation, processing, encapsulation sequence as discussed above—the on-premises gateway first removes the diagnostic encapsulation header, then processes the data packet by encrypting the data packet as needed and adding the VPN tunnel header, then adds a diagnostic encapsulation header as the outermost encapsulation header. However, in situations in which the on-premises gateway does not support the techniques described herein, the diagnostic packets end up with the VPN tunnel encapsulation header as the outermost encapsulation header. The on-premises gateway handles this situation as discussed above with reference to edge gateways.

In the inbound direction (e.g., diagnostic packets received by the endpoint), the edge gateway orders the VPN tunnel and diagnostic tunnel encapsulation headers in the order supported by the on-premises gateway. If the on-premises gateway supports the techniques discussed herein, the diagnostic encapsulation header is the outermost encapsulation header, and the on-premises gateway follows the decapsulation, processing, encapsulation sequence as discussed above. Otherwise, the VPN encapsulation is the outermost encapsulation header, and the on-premises gateway simply performs its normal processing.

In one or more embodiments, packet injection and/or handling is performed at an overlay network endpoint (e.g., a virtual resource in an overlay network). Diagnostic packets are intercepted or injected at a host (or a virtual machine) on the underlay network that hosts a tenant's overlay network (e.g., virtual machine or container). Diagnostics packets are intercepted before reaching the target endpoint in the overlay network. The diagnostic packets are then delivered to the diagnostic sink (e.g., a host, virtual machine, or network element) on the underlay network, which may implement a full transmission control protocol/Internet protocol (TCP/IP) stack or subset thereof to support active diagnostics using TCP connections. The component implementing the diagnostic sink also implements a traffic source that injects individual raw packets or a sequence of packets representing a flow at the point where traffic enters the underlay network from the tenant resource (e.g., the top of the outbound processing pipeline of a virtual switch port). Interception occurs at the point where the underlay network component is about to deliver the packet to the tenant resource, so that the packet would have completed all processing in the underlay network component (e.g., the top of inbound processing pipeline of a virtual switch port).

Instead of the usual decapsulation, processing, encapsulation sequence discussed above, the underlay network component intercepting a packet can perform only two stages: decapsulation and processing. The underlay network component intercepting the packet can also optionally respond to the packet if appropriate (e.g., if desired for the diagnostic experiment being performed). When injecting a packet, the underlay network performs the processing and encapsulation. To encapsulate the packet, the packet is identified as a diagnostic packet. This information is carried in meta data of the injected packet as discussed above.

The above techniques discussed herein thus support several diagnostic scenarios. One scenario is an end to end scenario in which diagnostic APIs are used to inject traffic between an Internet or on-premises endpoint and a tenant resource within the overlay network (in either direction). Another scenario is from the edge of the underlay network to a tenant resource within an overlay network. Another scenario is from a tenant resource in an overlay network to the interior of the underlay network edge. Another scenario is from a tenant resource in the overlay network to another tenant resource in the same overlay network. Another scenario is to have an edge gateway intercept and respond to packets from the tenant overlay on behalf of on-premises endpoints. This can be done with various types of network elements (e.g., a load balancer), which may be configured to respond to echo requests to a given VIP on behalf of the DIPs.

In one or more embodiments, a cloud platform API is exposed that allows specification of two terminal endpoints (the source endpoint and the target endpoint) in an active diagnostics experiment. The cloud platform API can be exposed by various components of the underlay network, such as the tracing service 402 of FIG. 4. As discussed above, the terminal endpoints can include: tenant resources (e.g., virtual machines, or container (virtual) network interface cards), network interfaces on canary VMs or similar that simulate Internet clients, virtual endpoints behind which load balanced tenant or cloud platform resources may be placed, virtual endpoints behind which network address translation (NAT) translated tenant or cloud platform resources may be placed, network interfaces on hosts or VMs within the cloud platforms, and endpoints on the on-premises network of a tenant. In addition to endpoints, the API also allows the specification of the traffic to be injected, such as the protocol type, packet sizes, duration, and traffic volume. For individual packets, the API allows specification of the full packet, including payload and headers.

A diagnostics component of the underlay network (e.g., the component exposing the API) configures traffic sources and sinks within the underlay network according to the endpoint and traffic parameters and with diagnostic tunnel parameters such as tunneling protocol and diagnostic tunnel identifier. The diagnostics component interfaces with a repository of all networking policies configured in the datacenter (e.g., via a software-defined networking (SDN) controller). This repository contains objects that represent the various network elements such as virtual networks, subnets, and NICs, including mac addresses and IP configurations, and routes. Based on the terminal endpoints the diagnostics component infers a set of intermediate network elements that the traffic should flow through and also the order in which these intermediate network elements will be hit by the flow of the traffic. For example, if the initiating endpoint is a canary VM simulating an internet client and the responding endpoint is a Virtual IP Endpoint, the diagnostics component is able to consult the repository of network elements to determine that the packet will hit either of the load balancers and following that the packet will hit one of the underlay resources which hosts a tenant VM that is placed behind the load balancer. As a result of this topology inference capability, the diagnostics component can configure network elements for example to enable support for diagnostic tunnels as needed and configure the properties of the diagnostic tunnels that the experiment will use. The API also optionally returns an operation identifier for tracking the state of the experiment.

Using the operation identifier, the API can be used to stop an ongoing experiment and validate and visualize the results. Network elements periodically write any packet processing events (the trace information discussed above) to the tracing service for correlation, analysis and reporting. The inferred topology is compared against the path of the packet captured in the traces to identify routing anomalies. To facilitate this, the trace information is, for example, tagged by a packet identifier and the TTL of the diagnostic encapsulation header. Trace information is also tagged by an identifier of the network element such as address, virtual network and type. The TTL in the diagnostic encapsulation header is used to determine the order of traversal of network elements as discussed above.

From the trace information, the tracing service is able to report at which network element in the underlay network the packet was dropped and also a reason for the drop. Additionally, the trace information can be used to learn what policies have been configured by the underlay network and/or overlay network administrators or owners to cause the packet drop. The diagnostics component can interface with the SDN controller to output all relevant control plane (underlay network) policies in the path of the packet overlaid with the entity that those policies correspond to, which makes troubleshooting the reason for the drop easier for the administrators and leads to a faster resolution of a tenant's complaint. As an example, consider the case where a packet drop occurred at the load balancer, the diagnostics component notes that the drop occurred at that element and then also notes all the policies configured on the load balancer for the Virtual Endpoint against which the experiment is conducted. This policy dump could include, for example, the infrastructure/tenant resources which are configured to serve the Virtual Endpoint and also the protocol (e.g., TCP/UDP) that is configured for use with the given virtual Endpoint. If the tenant was complaining about lack of reachability on the VIP endpoint using a protocol that isn't configured on the load balancer, the diagnostics experiment will note a packet drop at one of the load balancers on the path, the policy dump corresponding to the load balancer that appears along with this report will identify that no policies are configured on the load balancer for the given Virtual Endpoint for that protocol. This makes the administrator's diagnostics of the reason for the packet drop easier.

Additionally, in one or more embodiments, within the underlay network some network elements expose an API (e.g., a REST API) for enabling and disabling support for diagnostic tunnels and for configuring the properties of diagnostic tunnels such as tunnel identifier, tunnel protocol, the address of the tracing service to upload trace information to, and so forth. These APIs are accessible over the underlay network. Traffic sources/sinks deployed on-premises and on-premises gateways that support the techniques discussed herein also expose a similar API. The tenant's portal is pointed to the on-premises address at which the corresponding API is reachable, to perform the appropriate configuration.

Figure 5:
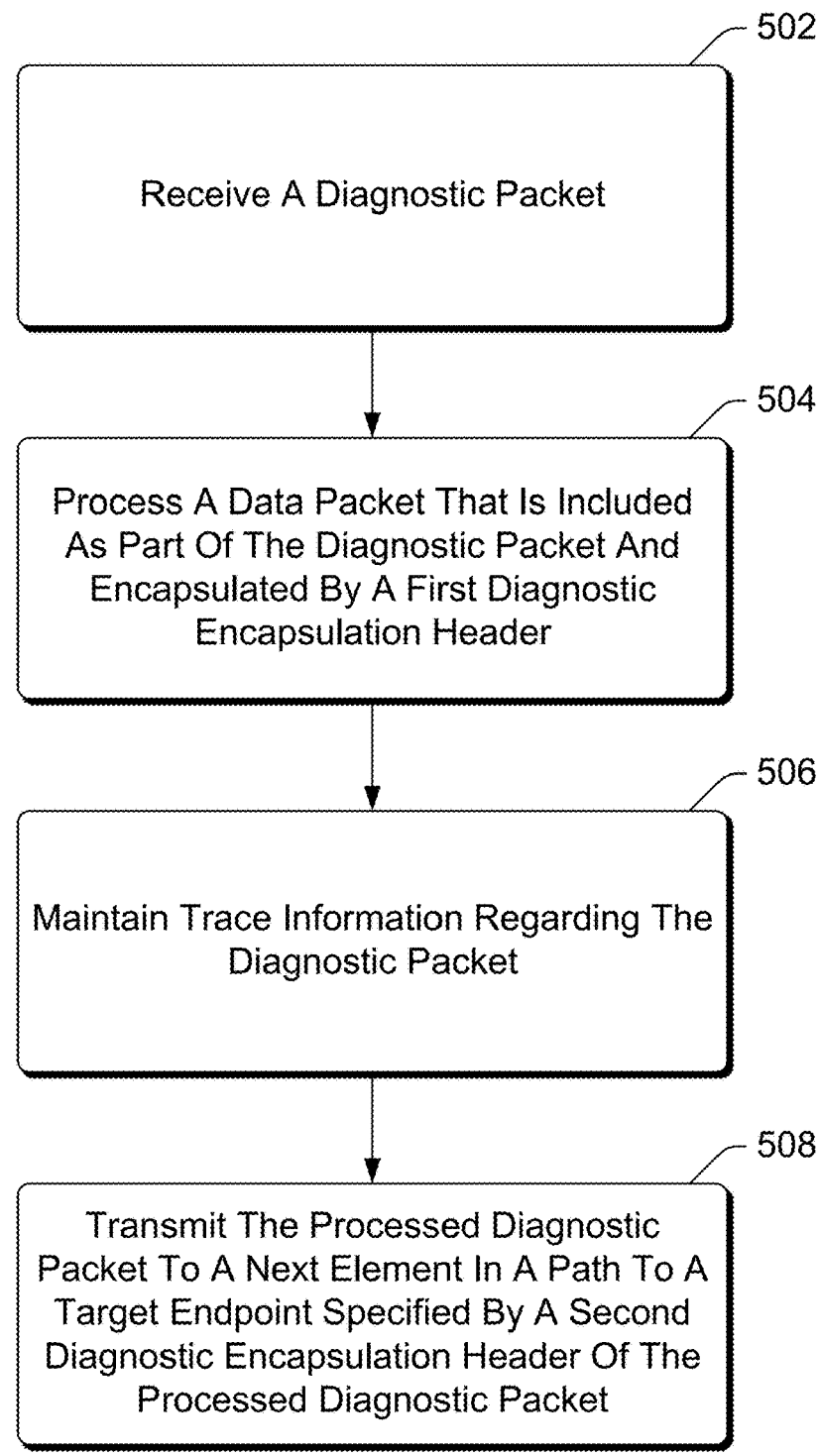
FIG. 5 is a flowchart illustrating an example process for implementing the active flow diagnostics for cloud-hosted networks in accordance with one or more embodiments.

FIG. 5 is a flowchart illustrating an example process 500 for implementing the active flow diagnostics for cloud-hosted networks in accordance with one or more embodiments. Process 500 is carried out by a network element of an underlay network, such as underlay network element 206 of FIG. 2, and can be implemented in software, firmware, hardware, or combinations thereof. Process 500 is shown as a set of acts and is not limited to the order shown for performing the operations of the various acts. Process 500 is an example process for implementing the active flow diagnostics for cloud-hosted networks; additional discussions of implementing the active flow diagnostics for cloud-hosted networks are included herein with reference to different figures.

In process 500, a diagnostic packet is received (act 502). The diagnostic packet can be received from a source endpoint or another network element of the underlay network.

A data packet that is included as part of the diagnostic packet and encapsulated by target endpoint first diagnostic encapsulation header is processed (act 504). Various different operations can be performed on the diagnostic packet as part of this processing as discussed above. Additionally, the first diagnostic encapsulation header can be removed from the diagnostic packet prior to the processing in act 504.

Trace information regarding the diagnostic packet is maintained (act 506). Various different trace information can be maintained as discussed above. The trace information is collected at the network element implementing process 500 and can be subsequently communicated to a tracing service as discussed above.

The processed diagnostic packet is transmitted to a next element in a path to a target endpoint specified by a second diagnostic encapsulation header of the processed diagnostic packet (act 508). In one or more embodiments, after processing of the data packet is completed in act 504, the processed data packet is encapsulated in the second diagnostic encapsulation header. The second diagnostic encapsulation header is added to (encapsulates) the processed data packet in act 508 rather than the first diagnostic encapsulation header.

Figure 6:
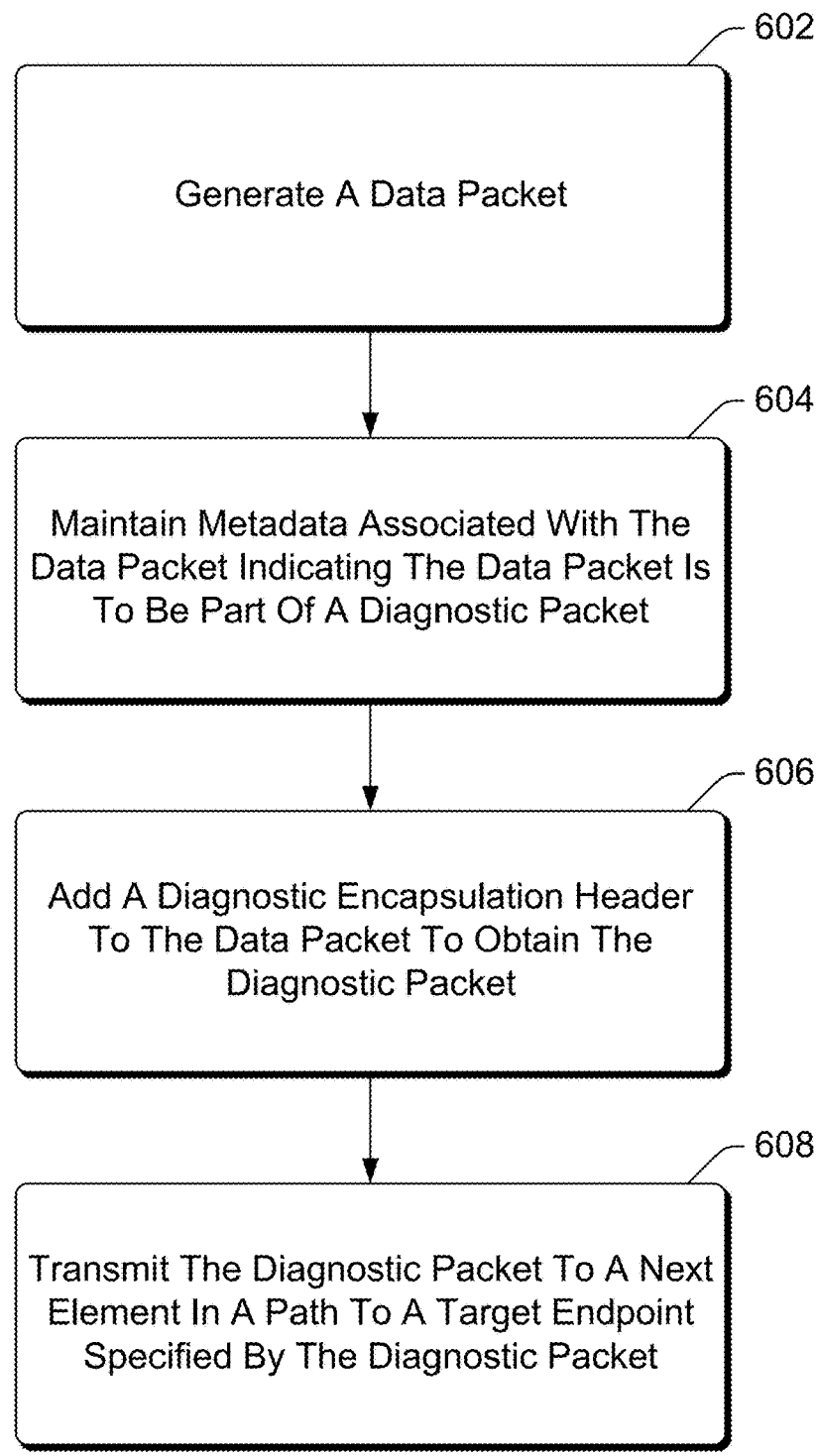
FIG. 6 is a flowchart illustrating another example process for implementing the active flow diagnostics for cloud-hosted networks in accordance with one or more embodiments.

FIG. 6 is a flowchart illustrating an example process 600 for implementing the active flow diagnostics for cloud-hosted networks in accordance with one or more embodiments. Process 600 is carried out by an endpoint, such as source endpoint 202 of FIG. 2, and can be implemented in software, firmware, hardware, or combinations thereof. Process 600 is shown as a set of acts and is not limited to the order shown for performing the operations of the various acts. Process 600 is an example process for implementing the active flow diagnostics for cloud-hosted networks; additional discussions of implementing the active flow diagnostics for cloud-hosted networks are included herein with reference to different figures.

In process 600, a data packet is generated (act 602). The data packet will be part of a diagnostic packet, and can include any of a variety of different data, commands, requests, and so forth. The data packet can be generated at various locations as discussed above, such as an endpoint in the overlay network, on behalf of an overlay network endpoint (e.g., within the virtual port that the overlay network element is connected to), at an endpoint that is not part of the overlay network, and so forth.

Metadata associated with the data packet indicating that the data packet is to be part of a diagnostic packet is maintained (act 604). The metadata is maintained by the endpoint and subsequently used by the endpoint to generate the diagnostic packet.

A diagnostic encapsulation header is added to the data packet to obtain the diagnostic packet (act 606). The diagnostic encapsulation header includes a network address of target endpoint of the diagnostic packet, and also an indicator that the diagnostic packet is a diagnostic packet.

The diagnostic packet is transmitted to a next element in a path to the target endpoint specified by the diagnostic packet (act 608). This next element can be, for example, a underlay network element in an underlay network.

Although discussions herein include reference to transmitting individual diagnostic packets, it should be noted that multiple diagnostic packets can be transmitted as part of a diagnostic experiment. In such situations, additional state information can also be maintained at the source endpoint and/or the target endpoint regarding the diagnostic packets. This state can track, for example, how far a stateful protocol has progressed during the diagnostic experiment. This state information can optionally also be provided to a tracing service (e.g., from tracing modules included in the source endpoint and/or target endpoint) to facilitate trace analysis.

Although particular functionality is discussed herein with reference to particular modules, it should be noted that the functionality of individual modules discussed herein can be separated into multiple modules, and/or at least some functionality of multiple modules can be combined into a single module.

Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

The techniques discussed herein provide various diagnostic support for overlay and underlay networks. In contrast to diagnostic approaches that analyze traffic flow only at overlay network endpoints, the techniques discussed herein allow data packet processing in the underlay network to be observed and analysis performed on those observations. Furthermore, in contrast to diagnostic approaches that analyze traffic flow only at ingress and egress endpoints of the underlay network, the techniques discussed herein allow data packet processing at intermediate network elements (between the ingress and egress endpoints of the underlay network) to be observed and analysis performed on those observations. E.g., data packet loss at intermediate network elements can be identified.

In addition, in contrast to diagnostic approaches that analyze traffic flow using only endpoints within the overlay network, the techniques discussed herein allow endpoints to be external to the overlay network. This allows observation of data packet processing across the edges of the overlay network (e.g., at Border Gateway Protocol (BGP) and gateway network elements) and analysis of those observations. Furthermore, in contrast to diagnostic approaches that analyze traffic flow based on deterministic routing, the techniques discussed herein allow observation of, and analysis based on those observations, data packets at all network elements in the underlay network for data packets or flows subject to non-deterministic routing. For example, packet (layer-3) routing within the underlay network can utilize equal-cost multi-path routing (ECMP), and at higher layers data packet flow may traverse one or more load balancers that non-deterministically route service requests to an instance of a redundant resource in the overlay network. Observation and analysis of data packet flow despite such non-deterministic routing can be performed using the techniques discussed herein.

Additionally, in contrast to diagnostic approaches that observe traffic flow only for short durations of time, the techniques discussed herein can be used for diagnostic packets over extended durations of time. This allows the techniques discussed herein to observe data packet drops that occur only occasionally. For example, data packets may be dropped by a network element due to interaction of protocol state with stateful intermediate network elements. Such interaction may result in occasional packet loss, timeouts, or excessive delays. These events may not occur frequently enough to capture and understand by observing traffic for a short duration of time at different points of the underlay network. However, by observing diagnostic packets sent over extended durations of time (e.g., hours or days), such events are more likely to be detected.

Additionally, in contrast to diagnostic approaches that treat diagnostic packets differently than non-diagnostic packets, the techniques discussed herein allow the diagnostic packets to remain indistinguishable from other overlay network data packets to all packet processing operations under observation in the network elements. The diagnostic packets incur a small amount of additional processing (e.g., just encapsulating and decapsulating the data packets).

Additionally, in contrast to diagnostic approaches that rely on endpoints in the overlay network receiving diagnostic packets, the techniques discussed herein do not rely on the target endpoints in the overlay network receiving particular diagnostic packets. Rather, data packets typically received by the target endpoints (e.g., data packets with ping commands or other requests) can be received, and the target endpoint need have no knowledge that the data packet is part of a diagnostic packet.

Additionally, the techniques discussed herein allow observation of, and analysis based on those observations, data packets communicated over encrypted channels or tunnels. The diagnostic packet is created by encapsulating the data packet in a diagnostic encapsulation header. If the data packet that is encapsulated is encrypted in some manner, the encapsulation of the data packet in the diagnostic encapsulation header does not alter or interfere with that encryption.

Additionally, the techniques discussed herein use the tracing modules in the underlay network element to collect trace information and provide that collected to a tracing service. This allows underlay network elements to keep track of the trace information rather than including the trace information in the diagnostic packets themselves. Furthermore, any endpoint (e.g., virtual machine) within an overlay network can be a target endpoint for a diagnostic packet—the techniques discussed herein do not rely on any single target endpoint being established in the overlay network.

Figure 7:
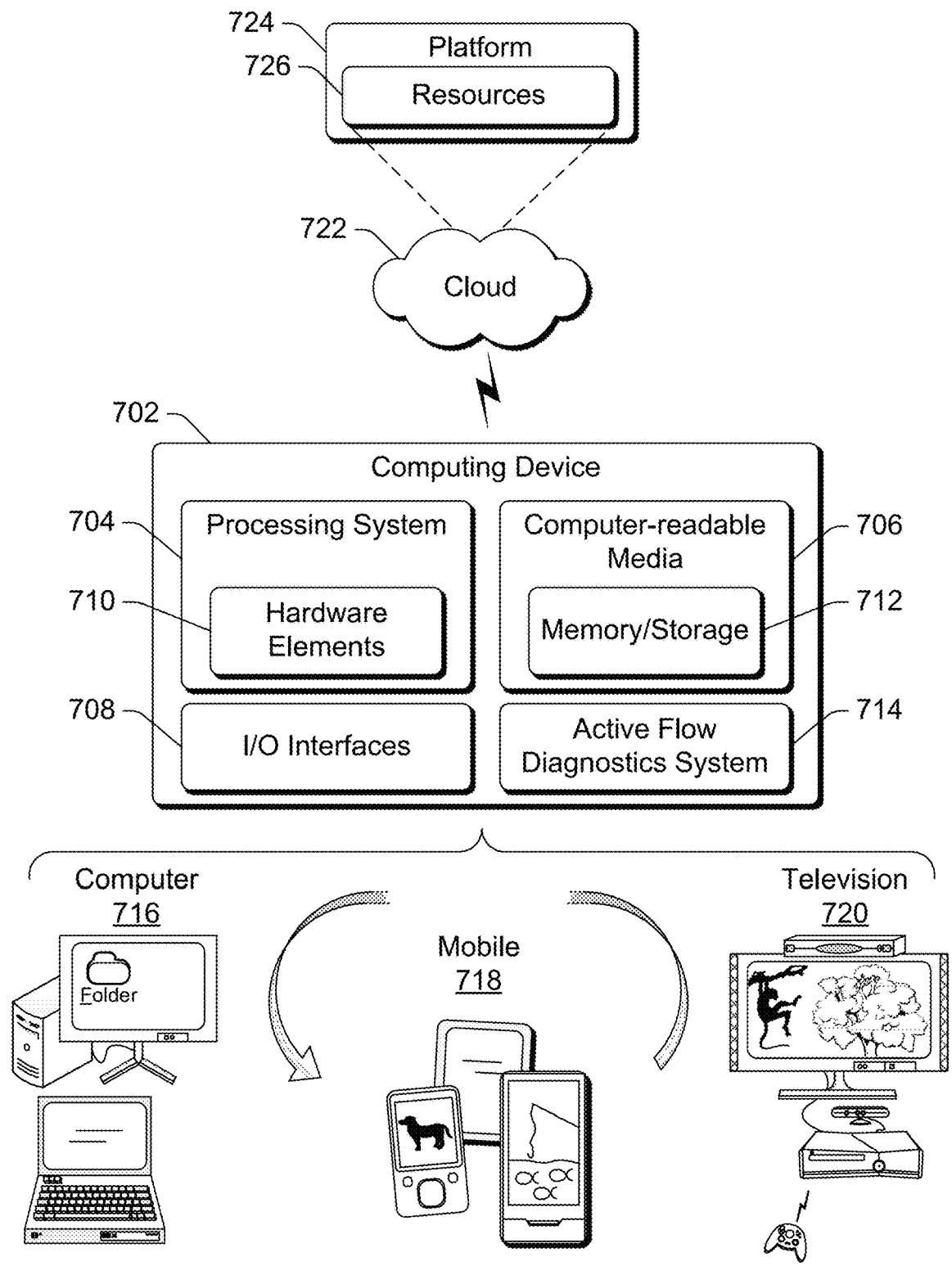
FIG. 7 illustrates an example system that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a server, a device associated with a client (e.g., a client device), a desktop or laptop computer, an on-chip system, and/or any other suitable computing device or computing system. The computing device 702 can be located within a data center (e.g., an on-premises device), can be located separately from a data center (e.g., an off-premises device), can be part of a tracing service, and so forth.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Resistive RAM (ReRAM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

The one or more input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

The computing device 702 also includes an active flow diagnostics system 714. The active flow diagnostics system 714 provides various active flow diagnostics functionality as discussed above. The active flow diagnostics system 714 can implement, for example, the diagnostic packet injection module and/or packet encapsulation module of a source endpoint, the packet decapsulation module and/or diagnostic packet interception module of a target endpoint, the packet decapsulation module and/or packet encapsulation module of a underlay network element, a tracing module of a underlay network element, a tracing service, and so forth.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a network element of an underlay network, the method comprising: receiving a diagnostic packet at the network element of the underlay network, the underlay network hosting one or more overlay networks; processing, by the network element, a data packet that is included as part of the diagnostic packet and encapsulated by a first diagnostic encapsulation header; maintaining, by the network element, trace information regarding the diagnostic packet; and transmitting the processed diagnostic packet to a next element in a path to a target endpoint specified by a second diagnostic encapsulation header of the processed diagnostic packet, the second diagnostic encapsulation header rather than the first diagnostic encapsulation header encapsulating the data packet.

Alternatively or in addition to any of the above described methods, any one or combination of: the next element in the path to the target endpoint comprising the target endpoint; the trace information comprising information regarding operations performed on the data packet by the network element; the trace information comprising a time to live value specified in the diagnostic packet; the first diagnostic encapsulation header including a first network address that is a target of the diagnostic packet, the second diagnostic encapsulation header including a second network address that is a target of the diagnostic packet, the first network address and the second network address being two different network addresses; the first diagnostic encapsulation header including a first port number that is a target of the diagnostic packet, the second diagnostic encapsulation header including a second port number that is a target of the diagnostic packet, the first port number and the second port number being two different port numbers; the method further comprising providing the trace information to a tracing service; the diagnostic packet being injected into the underlay network by a source endpoint that is in a same overlay network as the target endpoint; the diagnostic packet being injected into the underlay network by a source endpoint that is on-premises with the target endpoint but included in a different overlay network than the target endpoint; the diagnostic packet being injected into the underlay network by a source endpoint that is off-premises from the target endpoint and received at the underlay network via the Internet.

A device comprising: a packet decapsulation module configured to receive a diagnostic packet at the device and remove a first diagnostic encapsulation header from the diagnostic packet to obtain a data packet, the device comprising a network element of an underlay network that hosts one or more overlay networks; one or more processing modules configured to perform one or more operations on the data packet; a tracing module configured to maintain trace information regarding the diagnostic packet; and a packet encapsulation module configured to add a second diagnostic encapsulation header to the processed data packet to obtain a processed diagnostic packet, and send the processed diagnostic packet to a next element in a path to a target endpoint specified by the processed diagnostic packet.

Alternatively or in addition to any of the above described computing devices, any one or combination of: the trace information comprising information regarding operations performed on the data packet by the one or more processing modules; the trace information comprising a time to live value specified in the diagnostic packet; the tracing module being further configured to generate an identifier of the diagnostic packet by applying a hash function to at least part of the diagnostic packet, the trace information including the identifier of the diagnostic packet; the first diagnostic encapsulation header including a first network address that is a target of the diagnostic packet, the second diagnostic encapsulation header including a second network address that is a target of the diagnostic packet, the first network address and the second network address being two different network addresses as a result of the one or more operations performed on the data packet by the one or more processing modules.

A method implemented in a source endpoint of a network, the method comprising: generating a data packet; maintaining metadata associated with the data packet indicating that the data packet is to be part of a diagnostic packet; adding a diagnostic encapsulation header to the data packet to obtain the diagnostic packet; and transmitting the diagnostic packet to a next element in a path to a target endpoint specified by the diagnostic packet.

Alternatively or in addition to any of the above described methods, any one or combination of: the method further comprising obtaining a diagnostic tunnel identifier from remote service, and including the diagnostic tunnel identifier in the diagnostic encapsulation header; wherein the source endpoint is in a same overlay network as the target endpoint; wherein the source endpoint is on-premises with the target endpoint but not in the same overlay network as the target endpoint; wherein the source endpoint is off-premises from the target endpoint and the diagnostic packet is communicated, via the Internet, to an underlay network that hosts an overlay network that includes the target endpoint.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a network element of an underlay network, the method comprising:
   receiving, at the network element of the underlay network, a diagnostic packet injected by a source endpoint in a first overlay network and destined to a target end point in a second overlay network, the underlay network hosting the first and second overlay networks, the diagnostic packet having a diagnostic header and a payload containing a data packet to be processed by the network element in the underlay network, the diagnostic header indicating to the network element that the data packet is a part of the diagnostic packet injected by the source endpoint; and
   upon receiving the diagnostic packet, at the network element in the underlay network,
      removing the diagnostic header from the received diagnostic packet to produce the data packet;
      processing, by the network element, the data packet that is included as the payload of the diagnostic packet and encapsulated by the diagnostic header;
      maintaining, by the network element, metadata associated with the data packet that identifies the data packet as a part of the diagnostic packet;
      according to the maintained metadata, collecting and storing trace information regarding processing the data packet at the network element;
      re-encapsulating the processed data packet with another diagnostic header different than the diagnostic header of the received diagnostic packet, the another diagnostic header indicating to a next network element that the re-encapsulated data packet is a part of the diagnostic packet injected by the source endpoint; and
      transmitting the processed data packet re-encapsulated with the another diagnostic header to the next network element in the underlay network in a path to the target endpoint in the second overlay network.

2. The method as recited in claim 1 wherein the next network element in the path to the target endpoint comprising the target endpoint.

3. The method as recited in claim 1 wherein the trace information comprising information regarding operations performed on the data packet by the network element.

4. The method as recited in claim 1 wherein the trace information comprising a time to live value specified in the diagnostic packet.

5. The method as recited in claim 1 wherein the diagnostic header includes a first network address that is a target of the diagnostic packet, and wherein transmitting the processed data packet to the next network element includes encapsulating the processed data packet with a second diagnostic header including a second network address that is another target of the diagnostic packet, the second network address being different than the first network address.

6. The method as recited in claim 1 wherein the diagnostic header includes a first port number that is a target of the diagnostic packet, and wherein transmitting the processed data packet to the next network element includes encapsulating the processed data packet with a second encapsulation header including a second port number that is another target of the diagnostic packet, the first port number and the second port number being different from each other.

7. The method as recited in claim 1, further comprising providing the trace information from the network element to a tracing service.

8. The method as recited in claim 1 wherein the source endpoint and the target endpoint are in the same underlay network.

9. The method as recited in claim 1 wherein the source endpoint is on-premises with the target endpoint but included in a different overlay network than the target endpoint.

10. The method as recited in claim 1 wherein the source endpoint is off-premises from the target endpoint and received at the underlay network via the Internet.

11. A network element in an underlay network hosting one or more overlay networks, the network element includes an application-specific integrated circuit, a field-programmable gate array, a complex programmable logic device, or a logic processor that is configured to:
   receive, via the underlay network, a packet injected by a source endpoint in one overlay network hosted by the underlay network and destined to a target end point in another overlay network hosted by the underlay network, the received packet having (i) a header containing data indicating to the network element that the packet is a diagnostic packet and (ii) a payload containing a data packet encapsulated by the header; and
   upon receiving the packet, at the network element,
      remove, from the received packet, the header containing data indicating that the packet is a diagnostic packet to obtain the data packet;
      process the obtained data packet that is included as the payload of the received packet;
      during processing of the data packet,
         maintain metadata associated with the processed data packet, the metadata identifying the data packet as a part of the diagnostic packet; and
         collect and store trace information regarding processing the data packet at the network element according to the maintained metadata; and
      upon completion of processing the data packet, re-encapsulate the processed data packet with another header different than the header of the received packet and indicating to a next network element that the re-encapsulated data packet is a part of the diagnostic packet injected by the source endpoint; and transmit the processed data packet re-encapsulated with the another header to a next network element in a path to the target endpoint.

12. The network element as recited in claim 11 wherein the trace information includes information regarding operations performed on the data packet by the network element.

13. The network element as recited in claim 11 wherein the trace information includes a subset of data included in the diagnostic header or the payload of the diagnostic packet.

14. The network element as recited in claim 11 wherein the network element is further configured to generate an identifier of the received packet by applying a hash function to at least a part of the received packet, and wherein the trace information includes the generated the identifier of the received packet.

15. The network element as recited in claim 11 wherein the header includes a first network address that is a target of the received packet, and wherein the network element is also configured to encapsulate the processed data packet with another header including a second network address different than the first network address.

16. A method implemented in a network element of an underlay network hosting one or more overlay networks, the method comprising:

receiving, at the network element of the underlay network, a packet injected by a source endpoint in one overlay network hosted by the underlay network and destined to a target end point in one overlay network hosted by the underlay network, the packet having a header containing data indicating to the network element that the packet is a diagnostic packet and a payload containing a data packet; and upon receiving the packet, at the network element,
removing, from the received packet, the header containing the data indicating that the packet is a diagnostic packet to obtain the data packet;
processing one or more commands or requests in the data packet included as the payload of the received packet;

maintaining, by the network element, metadata associated with the data packet that identifies the data packet as a part of the diagnostic packet according to the data in the outer header of the received packet;
according to the maintained metadata, collecting and storing trace information regarding processing the data packet at the network element; and
upon completion of processing the data packet,
re-encapsulating the processed data packet with another header different than the header of the received packet and indicating to a next network element that the re-encapsulated data packet is a part of the diagnostic packet injected by the source endpoint; and
transmitting the processed data packet re-encapsulated with the another header to a next network element in a path to the target endpoint.

17. The method as recited in claim 16 wherein the trace information comprising information regarding a receipt of the packet at the network element, the one or more commands or requests of the data packet processed by the network element, and an identity of the next network element to which the processed data packet is transmitted.

18. The method as recited in claim 16 wherein the header includes a first network address that is a target of the diagnostic packet, and wherein transmitting the processed data packet to the next network element includes encapsulating the processed data packet with a second diagnostic header including a second network address that is another target of the diagnostic packet, the second network address being different than the first network address.

19. The method as recited in claim 16 wherein the diagnostic header includes a first port number that is a target of the diagnostic packet, and wherein transmitting the processed data packet to the next network element includes encapsulating the processed data packet with a second encapsulation header including a second port number that is another target of the diagnostic packet, the first port number and the second port number being different from each other.

20. The method as recited in claim 16 wherein the network element is further configured to generate an identifier of the diagnostic packet by applying a hash function to at least a part of the diagnostic packet, and wherein the trace information includes the generated the identifier of the diagnostic packet.

* * * * *